(12) United States Patent
Michael et al.

(10) Patent No.: US 11,625,286 B2
(45) Date of Patent: *Apr. 11, 2023

(54) TRANSACTIONAL LOCK ELISION WITH DELAYED LOCK CHECKING

(71) Applicant: International Business Machines Corporation, Armonk, NY (US)

(72) Inventors: Maged M. Michael, Danbury, CT (US); Marcel Mitran, Markham (CA); Martin Ohmacht, Yorktown Heights, NY (US); Kai-Ting Amy Wang, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/283,479

(22) Filed: Feb. 22, 2019

(65) Prior Publication Data
US 2019/0188054 A1  Jun. 20, 2019

Related U.S. Application Data

(63) Continuation of application No. 15/236,475, filed on Aug. 14, 2016, now Pat. No. 10,275,290, which is a
(Continued)

(51) Int. Cl.
*G06F 16/23* (2019.01)
*G06F 9/52* (2006.01)
(Continued)

(52) U.S. Cl.
CPC .............. *G06F 9/524* (2013.01); *G06F 3/067* (2013.01); *G06F 3/0619* (2013.01);
(Continued)

(58) Field of Classification Search
CPC ......... G06F 17/30286; G06F 17/30008; G06F 16/2343; G06F 9/524; G06F 3/0619
See application file for complete search history.

(56) References Cited

U.S. PATENT DOCUMENTS 7,321,898 B1 *  1/2008  Luo .................... G06F 16/2343
                                                 707/999.102
7,765,364 B2     7/2010  Rajwar et al.
(Continued)

OTHER PUBLICATIONS

Dice, D. et al., In Proc. of 22nd ACM Sym. on Parallelism in Algorithms and Architectures, Jun. 13-15, 2010, pp. 325-334, [retrieved Mar. 21, 2013] retrieved from the Internet: <https://labs.oracle.com/people/.../HTM-algs-SPAA-2010-final.pdf>.
(Continued)

*Primary Examiner* — Loc Tran
(74) *Attorney, Agent, or Firm* — Cuenot, Forsythe & Kim, LLC

(57) ABSTRACT

A computer-implemented method includes the following operations. A transactional lock elision transaction including a critical section is executed. The critical section is processed. After the processing of the critical section and prior to a commit point in the transactional lock elision transaction, a status of a lock is checked. Responsive to a determination that a status of the lock is free, a result of the transactional lock elision transaction is committed.

18 Claims, 9 Drawing Sheets

Related U.S. Application Data continuation of application No. 13/850,408, filed on Mar. 26, 2013, now Pat. No. 9,460,145.

(51) Int. Cl.
  *G06F 9/46* (2006.01)
  *G06F 3/06* (2006.01)
  *G06F 12/14* (2006.01)

(52) U.S. Cl.
  CPC .......... *G06F 3/0637* (2013.01); *G06F 3/0644* (2013.01); *G06F 9/466* (2013.01); *G06F 9/467* (2013.01); *G06F 12/1475* (2013.01); *G06F 16/2343* (2019.01); *G06F 2212/1052* (2013.01)

(56) References Cited

U.S. PATENT DOCUMENTS

| | | | |
|---|---|---|---|
| 8,041,926 B2 | 10/2011 | Tene et al. | |
| 9,460,145 B2 | 10/2016 | Michael et al. | |
| 9,529,838 B2 | 12/2016 | Michael et al. | |
| 2001/0014905 A1* | 8/2001 | Onodera | G06F 9/52 719/312 |
| 2003/0079094 A1* | 4/2003 | Rajwar | G06F 9/52 712/E9.05 |
| 2005/0081204 A1* | 4/2005 | Schopp | G06F 9/526 718/100 |
| 2010/0138841 A1* | 6/2010 | Dice | G06F 9/466 718/107 |
| 2011/0138135 A1 | 6/2011 | Dice et al. | |
| 2011/0314244 A1 | 12/2011 | Sodhi et al. | |
| 2012/0084536 A1 | 4/2012 | Jacobson et al. | |
| 2014/0297610 A1 | 10/2014 | Michael et al. | |
| 2014/0298342 A1 | 10/2014 | Michael et al. | |
| 2016/0371128 A1 | 12/2016 | Michael et al. | |

OTHER PUBLICATIONS

Dice, D. et al., In 3rd ACM SIGPLAN Workshop on Transactional Computing, 2008, pp. 1-10, [retrieved Mar. 21, 2013] retrieved from the Internet: <www.unine.ch/transact08/papers/Dice-Applications.pdf>.

Rossbach, C.J. et al., In Proc. of 21st ACM SIGOPS Sym. on Operating Systems Principles (SOSP '07), Oct. 14-17, 2007, pp. 87-102 [retrieved Mar. 21, 2013] retrieved from the Internet: <www.cs.utexas.edu/~witchel/pubs/sosp2007-fp56-rossbach.pdf>.

Rossbach, C.J., Univ. of Texas Doctoral Thesis, Aug. 2009 [retrieved Mar. 21, 2013] retrieved from the Internet: <http://repositories.lib.utexas.edu/handle/2152/10618>. 204 pgs.

U.S. Appl. No. 13/850,408, Non-Final Office Action, dated Jul. 23, 2015, 12 pg.

U.S. Appl. No. 13/850,408, Final Office Action, dated Jan. 5, 2016, 12 pg.

U.S. Appl. No. 13/850,408, Notice of Allowance, dated Jun. 22, 2016, 9 pg.

U.S. Appl. No. 14/227,420 Non-Final Office Action, dated Feb. 29, 2016, 12 pg.

U.S. Appl. No. 14/227,420 Final Office Action, dated Jun. 16, 2016, 14 pg.

U.S. Appl. No. 14/227,420, Notice of Allowance, dated Aug. 16, 2016, 12 pg.

U.S. Appl. No. 15/236,475, Non-Final Office Action, dated May 3, 2018, 12 pg.

U.S. Appl. No. 15/236,475, Final Office Action, dated Nov. 9, 2018, 15 pg.

U.S. Appl. No. 15/236,475, Notice of Allowance, dated Dec. 18, 2018, 8 pg.

\* cited by examiner

FIG. 4

Table 400

| Case | Thread 1 | Thread 2 |
|---|---|---|
| 1 | | Acquire lock |
| | | Store C |
| | Start TLE transaction | |
| | Load A | |
| | | Store D |
| | | Release lock |
| | Load B | |
| | Check lock (free) 410 | |
| | Commit TLE transaction - success | |
| 2 | | Acquire lock |
| | | Store A |
| | Start TLE transaction | |
| | Load A (new) | |
| | | Store B |
| | | Release lock |
| | Load B (new) | |
| | Check lock (free) 410 | |
| | Commit TLE transaction - success | |
| 3 | Start TLE transaction | |
| | Load A | |
| | | Acquire lock |
| | | Store C |
| | | Store D |
| | | Release lock |
| | Load B | |
| | Check lock (free) 410 | |
| | Commit TLE transaction - success | |
| 4 | Start TLE transaction | |
| | Load A | |
| | | Acquire lock |
| | | Store B |
| | | Store C |
| | | Release lock |
| | Load B (new) | |
| | Check lock (free) 410 | |
| | Commit TLE transaction - success | |

402 (Case 1)
404 (Case 2)
406 (Case 3)
408 (Case 4)

FIG.7

Conventional locking
700

```
pthread_mutex_lock(pthread_mutex_t * lock)                    702 while (1) {
    if (start_speculation()) {                                706
        if (lock is free) {
            /* speculatively read the lock variable */
            return 0;  /* means no errors  */
        }
        /* lock is busy */
        abort_speculation(); /* takes control flow to "else" of "if (start_speculation())" */
    } else {
        /* speculation() failed */
        /* do profiling, assessing return code for the failure, etc */
        if (decide_to_give_up()) {
            /* fallback on conventional lock acquire on the lock */
            break;
        }
        /* else, try TLE again - go to "if (start_speculation())" */
    }
}
/* fallback on conventional lock acquire on the lock */
....

pthread_mutex_unlock(pthread_mutex_t * lock)                  704 if (is_speculative()) {
    if (commit_speculation()) {
        /* was inside a TLE transaction - no need to release the lock */
        /* the critical section was executed successfully inside a TLE transaction */
        return 0; /* means no errors */
    } else {
        abort_speculation();
    }
} else {
    /* was not in a TLE transaction */                        708
    /* execute conventional release code to release the lock */
    ...
}
```

FIG.8

Deferred locking
800

```
pthread_mutex_lock(pthread_mutex_t * lock)                          802 while (1) {
    if (start_speculation()) {                                      806
        return 0;
    } else {
        /* speculation() failed */
        /* do profiling, assessing return code for the failure, etc */
        if (decide_to_give_up()) {
            /* fallback on conventional lock acquire on the lock */
            break;
        }
        /* else, try TLE again - go to "if (start_speculation())" */
    }
}
/* fallback on conventional lock acquire on the lock */
....

pthread_mutex_unlock(pthread_mutex_t * lock)                        804 if (is_speculative()) {                                             808
    if (lock is busy) {
        abort_speculation();
    }
    if (commit_speculation()) {
        /* was inside a TLE transaction - no need to release the lock */
        /* the critical section was executed successfully inside a TLE transaction */
        return 0; /* means no errors */
    }
} else {                                                            810
    /* Was not in a TLE transaction */
    /* execute conventional release code to release the lock */
    ...
}
```

TRANSACTIONAL LOCK ELISION WITH DELAYED LOCK CHECKING

BACKGROUND

1. Technical Field

This disclosure relates generally to lock elision in a data processing system and more specifically to high concurrency transactional lock elision with delayed lock checking in the data processing system.

2. Description of the Related Art

In a multithreaded environment when a data conflict occurs, for example, two or more threads compete for a same data portion (other than a read operation), atomicity of the transaction cannot be guaranteed and a lock may be acquired to prevent data error. A data conflict among the two or more threads may be detected using existing transactional lock elision (TLE) techniques. TLE techniques typically use underlying transactional memory (TM) systems in an attempt to avoid lock acquisition and subsequent release.

In particular, transactional lock elision techniques typically rely on an underlying transactional memory system to detect conflicts associated with memory accesses inside critical sections of code associated with elided locks, and detect acquisitions of such locks. Transactional lock elision allows for a possibility threads acquire locks instead of eliding the locks, for example, when critical sections are not suited for transactional lock elision, or to enable forward progress of a process.

Therefore, transactional lock elision techniques include a step to read an elided-lock inside, at the start, of a transaction and determine whether the lock is free, to enable the transactional memory system to detect concurrent lock acquisitions. Transactional lock elision techniques determine whether a lock is free at a beginning of a transactional lock elision transaction before executing the critical section protected by the elided lock.

Typical solutions to avoid locking include a conservative locking approach. For example, a lock may be acquired only to ensure correctness, rather than when such lock is needed which typically over uses locking and degrades potential code performance. In another example solution a developer follows a particular and more rigid program design including specific and appropriate levels of locking. The careful design enables more optimized performance due to the increased emphasis on program design. In another example, a global locking mechanism may be used to prevent conflicts, particularly in an environment when thread safety cannot be ensured. Global locking typically results in reduced performance.

SUMMARY

According to one embodiment, a computer-implemented method for transactional lock elision, comprising initiating a transactional lock elision transaction containing a critical section, executing the transactional lock elision transaction including the critical section and checking a status of a lock prior to a commit point in the transactional lock elision transaction executing, wherein the checking the status occurs after processing the critical section. The method further comprising determining whether the status of the lock checked is free and responsive to a determination the lock checked is free, committing a result of the transactional lock elision transaction.

According to another embodiment, a computer program product for transactional lock elision comprises a computer readable storage device containing computer executable program code stored thereon. The computer executable program code comprises computer executable program code for initiating a transactional lock elision transaction containing a critical section; computer executable program code for executing the transactional lock elision transaction including the critical section; computer executable program code for checking a status of a lock prior to a commit point in the transactional lock elision transaction executing, wherein the checking the status occurs after processing the critical section; computer executable program code for determining whether the status of the lock checked is free and computer executable program code responsive to a determination the lock checked is free, for committing a result of the transactional lock elision transaction.

According to another embodiment, an apparatus for transactional lock elision comprises a communications fabric; a memory connected to the communications fabric, wherein the memory contains computer executable program code; a communications unit connected to the communications fabric; an input/output unit connected to the communications fabric; a display connected to the communications fabric and a processor unit connected to the communications fabric. The processor unit executes the computer executable program code to direct the apparatus to initiate a transactional lock elision transaction containing a critical section; execute the transactional lock elision transaction including the critical section; check a status of a lock prior to a commit point in the transactional lock elision transaction executing, wherein the checking the status occurs after processing the critical section; determine whether the status of the lock checked is free and responsive to a determination the lock checked is free, commit a result of the transactional lock elision transaction.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 4 is a block diagram of a tabular representation of examples of using the deferred locking system of FIG. 3 in accordance with an embodiment of the disclosure;

FIG. 7 is a pseudo code example of a conventional locking solution;

FIG. 8 is a pseudo code example of using an embodiment of the deferred locking system of FIG. 3 using the pseudo code example of FIG. 7.

DETAILED DESCRIPTION

Figure 1:
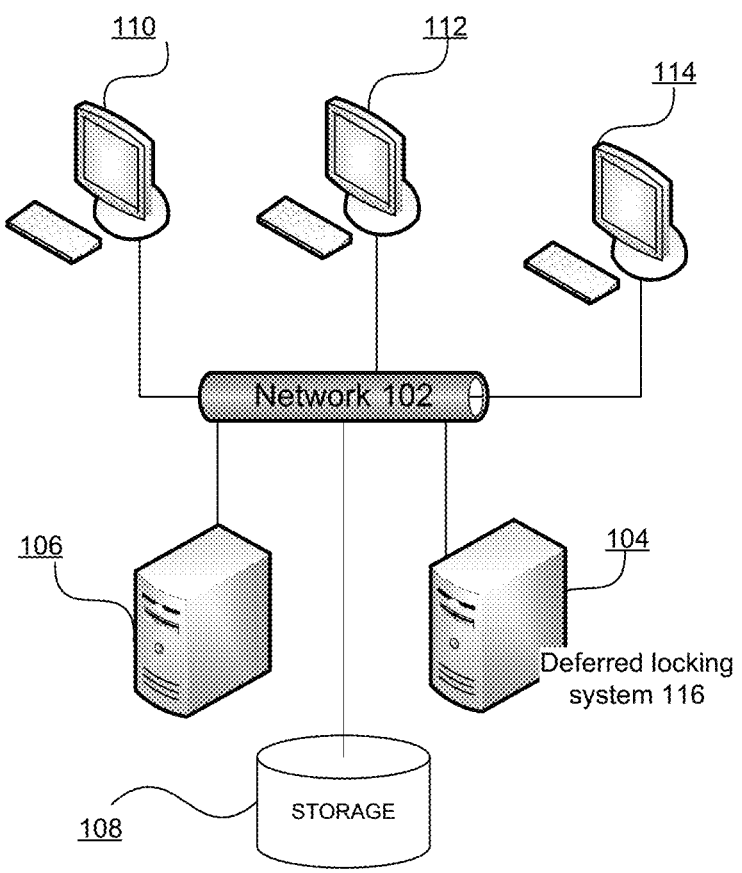
FIG. 1 is a block diagram of an exemplary network data processing system operable with an embodiment the deferred locking system of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
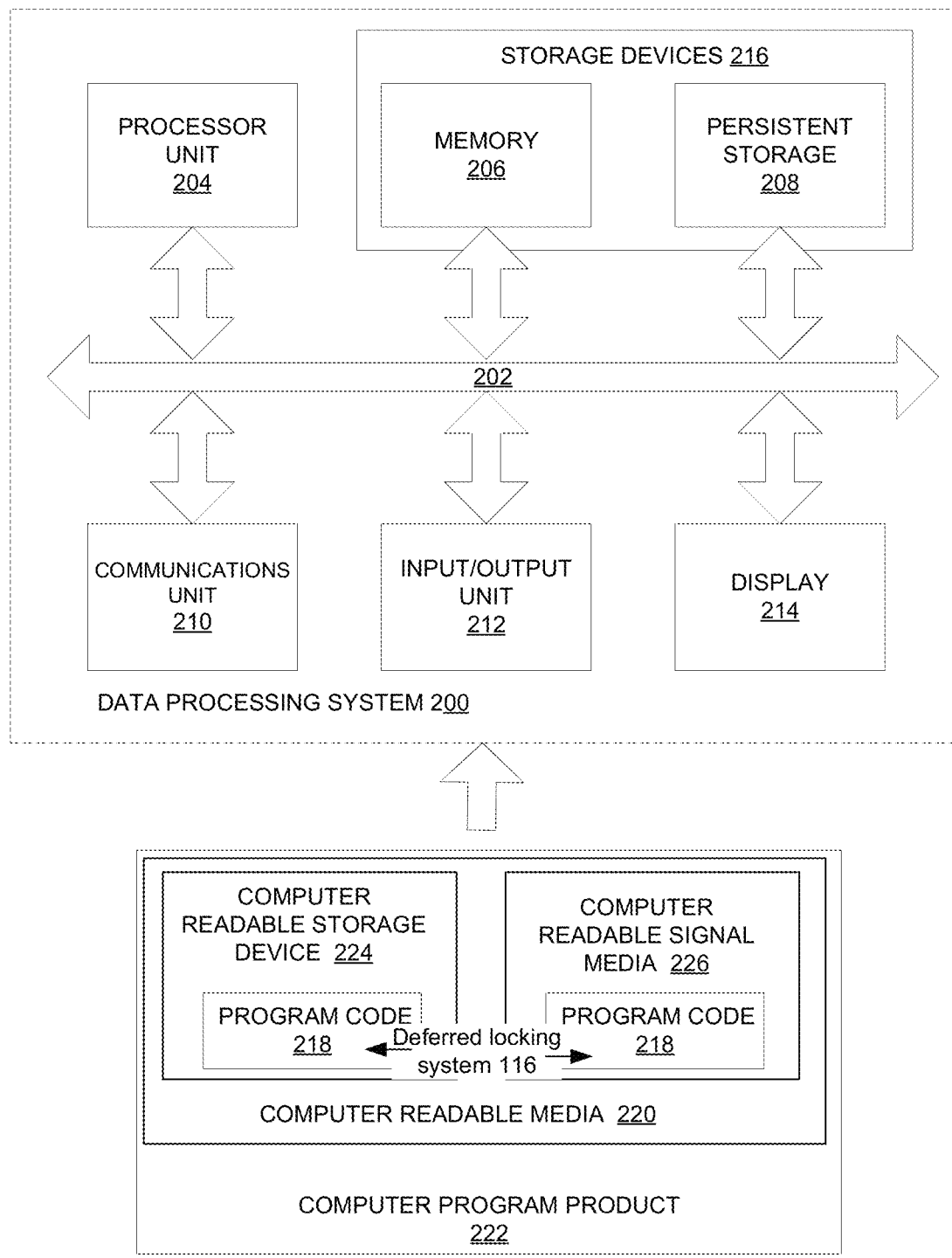
FIG. 2 is a block diagram of an exemplary data processing system operable with an embodiment the deferred locking system of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for transactional lock elision is presented. Processor unit 204 initiates a transactional lock elision transaction containing a critical section and executes the transactional lock elision transaction including the critical section. Processor unit 204 checks a status of a lock prior to a commit point in the transactional lock elision transaction executing, wherein the checking the status occurs after processing the critical section. Processor unit 204 determines whether the status of the lock checked is free and responsive to a determination the lock checked is free, commits a result of the transactional lock elision transaction.

Previous implementations using transactional lock elision techniques determine whether a lock is free at the beginning of the TLE transaction before executing the critical section protected by an elided lock. Performing a determination at this point in processing of the code tends to prevent concurrent execution of non-conflicting critical sections when a thread acquires the lock. Using the previous implementation techniques of transactional lock elision, once a thread acquires a lock, the acquisition causes a failure of any currently running TLE transactions associated with a same lock, and prevents the start of an associated TLE transaction until the lock is released. The result is the same when the lock-acquiring critical section does not conflict with other critical sections. Previous implementation techniques using transactional lock elision therefore typically place a limitation on concurrent execution, which is not necessary in all situations of use.

Figure 3:
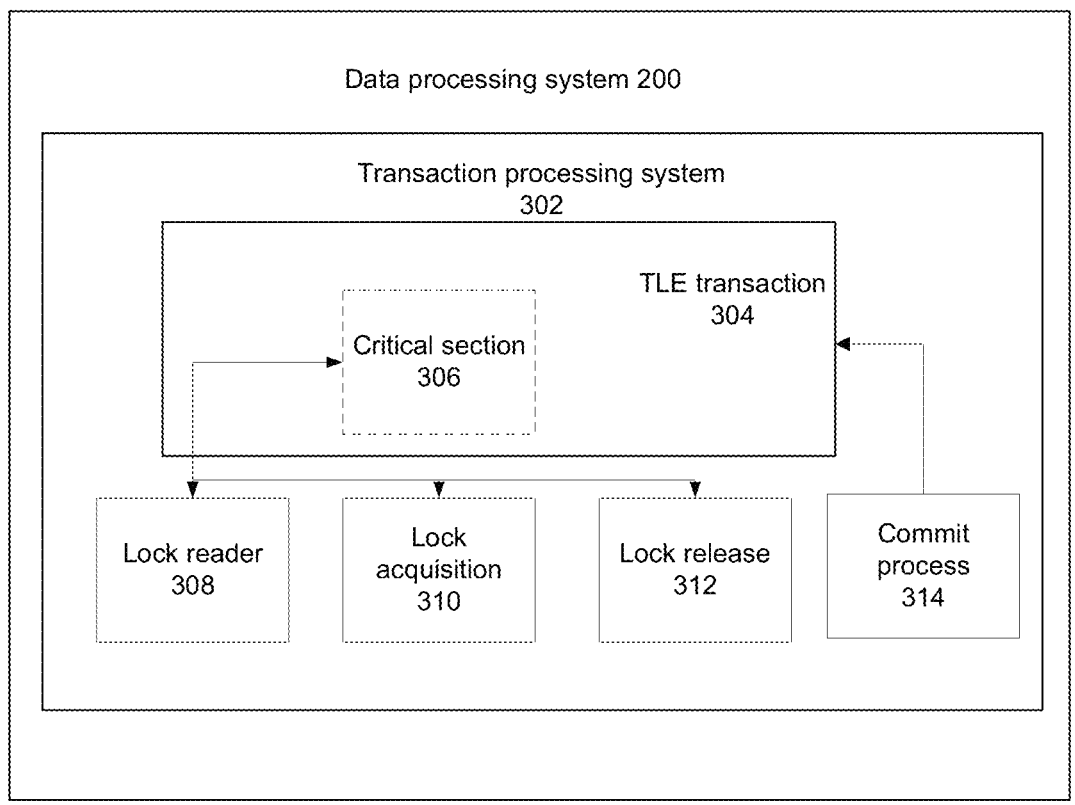
FIG. 3 is a block diagram of a deferred locking system operable in an embodiment of the disclosure.

With reference to FIG. 3 a block diagram of a deferred locking system operable for various embodiments of the disclosure is presented. Deferred locking system 300 is an example of an embodiment of the deferred locking, also referred to as transactional lock elision of the disclosure.

Deferred locking system 300 leverages an underlying data processing system such as a network of data processing system 100 of FIG. 1 or data processing system 200 of FIG. 2. More particularly an embodiment of deferred locking system 300 may be hosted on server 104 of FIG. 1 as shown, or in another example, on data processing system 200 of FIG. 2, in particular, in the example, in storage as program code 218.

Deferred locking system 300, in the example of FIG. 3, operates within a context of data processing system 200 and further in view of transaction processing system 302. TLE transaction 304 is processed within the confines of transaction processing system 302 including one or more portions considered subject to a locking implementation. The one or more portions considered for locking during process are referred to as critical section 306. Using supporting services of lock reader 308, lock acquisition 310 and lock release 312 enables transaction processing system 302 to effectively manage processing of TLE transaction 304, which includes use of commit process 314 to finalize updates upon completion of a critical section of the transaction.

TLE transaction 304 comprises one or more units of work, which can each, contain one or more sections referred to as critical section 306. Actions within critical section 306 may or may not require lock acquisition and release operations. In previous solutions a conservative approach would tend to acquire a lock for a period of processing regardless of whether the lock was needed. Acquisition of the lock when not needed caused unnecessary delay in the processing routine acquiring the lock and to other routines awaiting release of the lock.

Lock reader 308 provides a capability to read a lock during TLE transaction 304. Using an embodiment of the disclosed deferred lock process, lock reader 308 reads the status of the lock after executing a critical section of the code and while within TLE transaction 304. For example a lock read is performed after executing the code in a critical section but before a commit operation to persist the result of executing the code section is performed. Performing the lock read after processing the critical section is in contrast to a conventional lock read operation, of previous implementation techniques using transactional lock elision, which is performed ahead of the processing the critical section.

Deferring the lock read, as disclosed, enables processing to continue up to a point of commit processing without a lock. Although the processing in this case is somewhat speculative, the disclosed process enables processing to continue whereas a conventional lock read process would have otherwise incurred a lock acquisition unnecessarily or a wait due to another process obtaining a lock.

In contrast with previous implementation techniques, an embodiment of the disclosure reads and checks the lock after executing the critical section (however still inside a transaction) rather than before as in the previous implementation techniques. An embodiment of the disclosure accordingly enables TLE transactions to succeed concurrently with critical sections that acquire an associated lock. Further, an embodiment of the disclosure also limits the negative effect of occasional TLE-related lock acquisition. Examples illustrating successful operations concurrently with critical sections that acquire an associated lock are described in a later section.

Lock acquisition 310 and a complimentary function of lock release 312 work in combination to obtain a needed lock and to release the lock previously obtained when necessary. Commit process 314 provides a capability to finalize processing of the operation in the executing portion of the transaction. Commit process 314 stores, or persists, the result of a particular operation in a storage device for example, storage devices 216 of data processing system 200 of FIG. 2.

With reference to FIG. 4 a tabular representation of examples using a deferred locking system operable for various embodiments of the disclosure is presented. Table 400 recites four illustrative examples using deferred locking system 300 of FIG. 3. Each example illustrates an embodiment of the deferred locking of the disclosure using a representative sequence of operations in successful concurrent executions of the disclosed process, which would not be available using the previous implementations of conventional locking solutions.

Using example 402, representing case 1, Thread 2 acquires a lock and performs a Store C operation. Thread1 Starts TLE transaction starts thereafter and follows with a Load A operation.

Thread2 now performs Store D followed by Release Lock. Thread1 performs a Load B followed by a Check Lock (free) 410. Because the Lock was not held by another thread, Thread1 performs Commit TLE transaction with success.

The first example clearly shows the deferred checking of the lock status late in the sequence of processing the TLE transaction, after Load B but within the TLE transaction and before a commit operation is required.

Using example 404, representing case 2, Thread 2 Acquires a lock and performs a Store A operation. Thread1 then Starts TLE transaction and follows with a Load A (new) operation.

Thread2 now performs Store B followed by Release Lock. Thread1 performs a Load B (new) followed by a Check Lock (free) 410 as before. Because the Lock was not held by another thread, Thread1 performs Commit TLE transaction with success.

The second example also shows the deferred checking of the lock status late in the sequence of processing the TLE transaction, after Load B (new), but within the transaction and before a commit operation is required.

Using example 406, representing case 3, Thread1 Starts TLE transaction and follows with a Load A operation. Thread 2 Acquires a lock and performs a Store C and a Store D operations. Thread2 also performs a Release Lock.

Thread1 performs a Load B followed by a Check Lock (free) 410 as before. Again because the Lock was not held by another thread, Thread1 performs Commit TLE transaction with success.

The third example also shows the load operations of Thread2 interspersed between the two load operations of Thread1. Thread1 performs a deferred checking of the lock status late in the sequence of the TLE transaction, Load B, but within the transaction and before a commit operation is required.

Using example 408, representing case 4, Thread1 Starts TLE transaction and follows with a Load A operation. Thread 2 Acquires a lock and performs a Store B and a Store C operations. Thread2 also performs a Release Lock.

Thread1 performs a Load B (new) followed by a Check Lock (free) 410 as before. Again because the Lock was not held by another thread, Thread1 performs Commit TLE transaction with success.

The fourth example also shows the load operations of Thread2 interspersed between the two load operations of Thread1. Thread1 performs a deferred checking of the lock status late in the sequence of the TLE transaction, after Load B (new), but within the transaction and before a commit operation is required.

In each case processing was enabled to continue rather than having to wait for a lock or to unnecessarily acquire a lock when not needed. The examples illustrate avoidance of a lock acquisition can provide a successful outcome. Lock acquisition and lock checking deferral therefore enables processing to continue whereas previous conventional implementation initiated the same actions early in the transaction tended to cause unnecessary delay or failure of the transaction or transactions.

Figure 5:
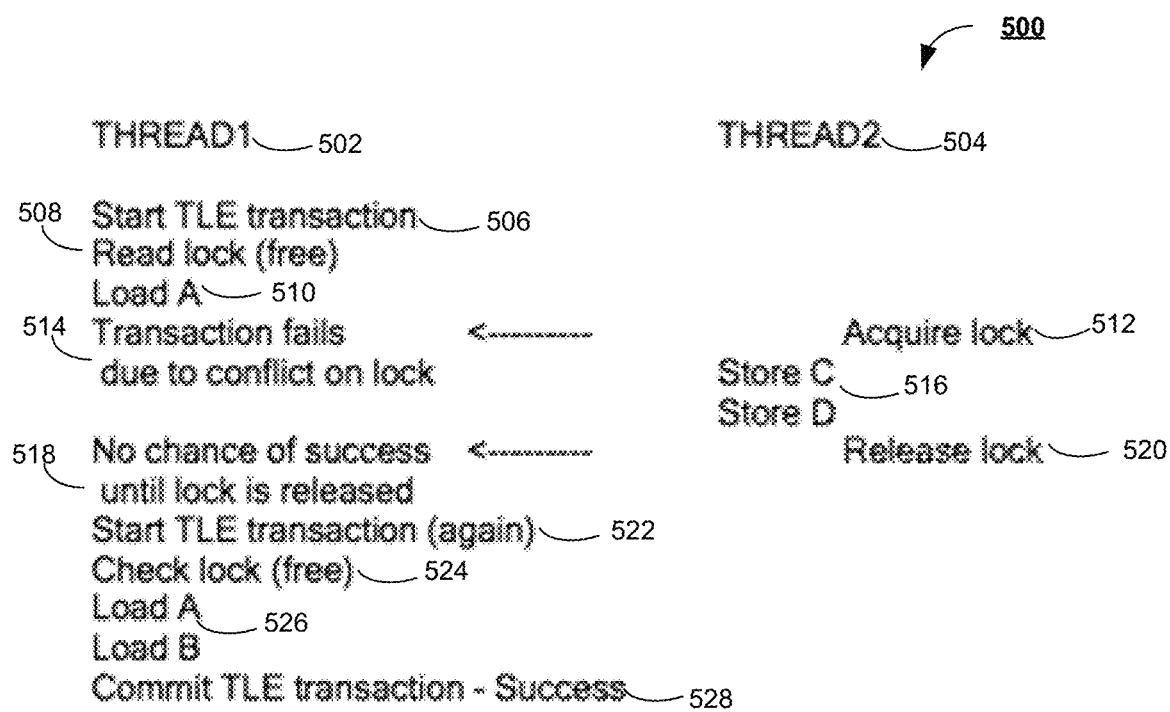
FIG. 5 is a pseudo code representation of an example of FIG. 4 when not using an embodiment of the deferred locking system of FIG. 3.

With reference to FIG. 5 a pseudo code representation using an example of FIG. 4 is presented. Snippet 500 recites a similar example as example 406 of FIG. 4; however in this example of snippet 500 deferred locking system 300 of FIG. 3 is not used. In this illustrative embodiment the deferred locking of FIG. 3 is not used, resulting in a failure of concurrent processing while the lock was held, Snippet 500 recites THREAD1 502 and THREAD2 504 in concurrent operation within a data processing system such as data processing system 200 of FIG. 2. THREAD1 502 performs start TLE transaction 506 followed by Read lock (free) 508. Load A 510 is issued but THREAD2 504 also just acquired lock 512. Therefore the Transaction fails due to conflict on lock 514 for THREAD1 502.

THREAD2 504 meanwhile performs Store C and Store D 516. THREAD1 502 has No chance of success until lock is released 518. THREAD2 504 performs release lock 520.

THREAD1 502 performs Start TLE transaction (again) 522 followed by Check lock (free)□524. THREAD 1 502 successfully performs Load A□ and Load B 526.

THREAD1 502 terminates with Commit TLE transaction—Success 528.

The example illustrates the difference between the processing sequences of the transactions using an embodiment of deferred locking system 300 of FIG. 3 in comparison with a prior solution, which does not use deferred locking system 300 of FIG. 3. As clearly shown in the example illustrated, THREAD 1 502 need not have incurred a transaction failure due to the concurrent processing of THREAD2 504. Only the conservative locking operation unnecessarily lead to the failure of THREAD1 502 rather than actual processing demands of THREAD2 504.

Figure 6:
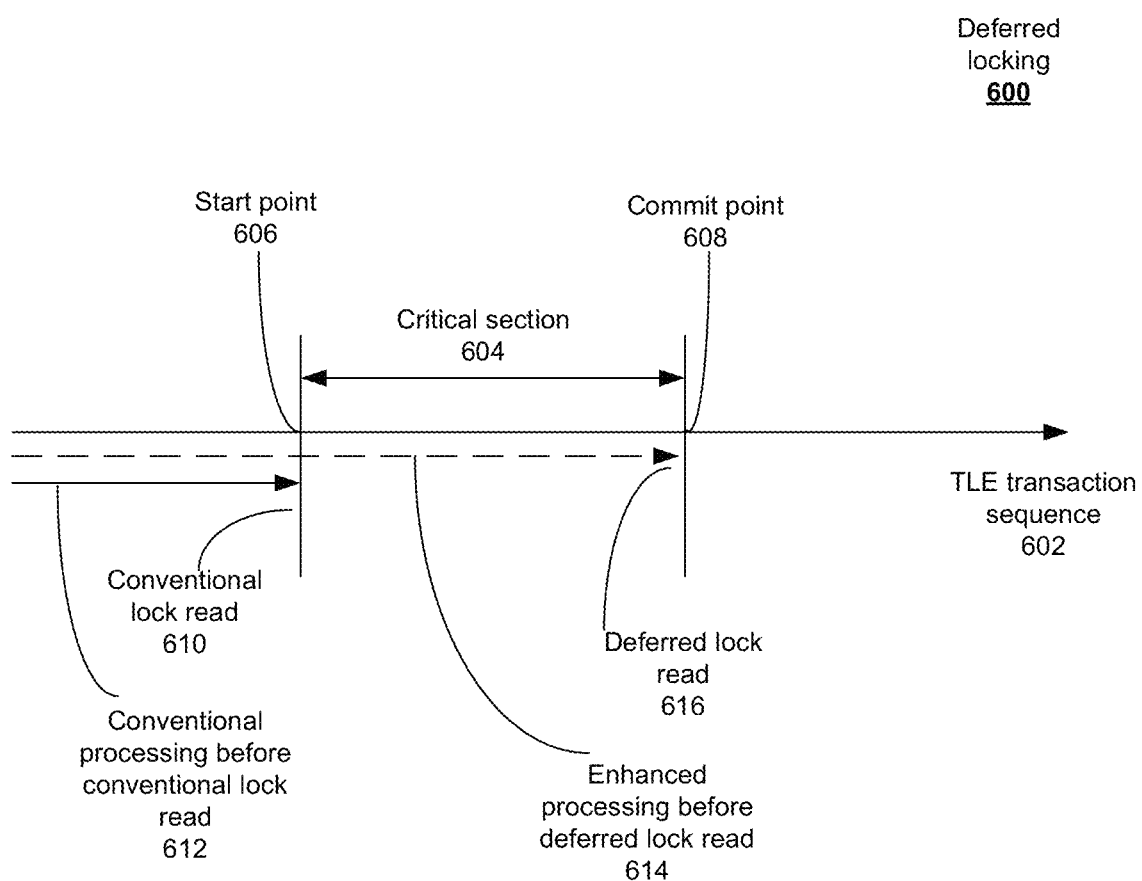
FIG. 6 is a schematic overview of a process using the deferred locking system of FIG. 3.

With reference to FIG. 6 a schematic overview an example of FIG. 4 when not using the deferred locking system of FIG. 3 is presented. Deferred locking 600 provides a time based view of an example such as snippet 406 of FIG. 4 which uses deferred locking system 300 of FIG. 3 in comparison with a transaction which does not used the disclosed deferred locking process.

FIG. 6 illustrates overview of a process using the deferred locking process of FIG. 3 in which process 600 is a representation of processing of TLE transaction sequence 602, which forms a base timeline. Critical section 604 occurs in some portion of TLE transaction sequence 602 and is bounded by start point 606 and commit point 608.

Conventional lock read 610 is performed by a transaction, which does not implement an embodiment of the disclosed process. Conventional lock read 610 is performed at the end of conventional processing before conventional lock read 612 at start point 606. Conventional processing before conventional lock read 612 (not a part of the critical section) may be delayed at this point in response to a result of the lock read. For example when the transaction has to spin while waiting for a lock currently in use by another thread to be freed, or simply the time to obtain the lock when available. Further when a lock is not available the transaction typically times out after a predetermined amount of time.

In contrast using an embodiment of the disclosed process the processing completed before a lock read occurs is much more than when using a previous implementation of lock elision. As shown, enhanced processing before deferred lock read 614 progresses past start point 606 and through critical section 604 up to deferred lock read 614 which is just before commit point 608. When compared with the previous implementation of lock elision, deferred locking 600 illustrates a positive difference in processing due to the deferred lock processing. Using an embodiment of deferred locking 600 accordingly typically enables more concurrency in processing than previous implementation of lock elision. This is because the time window from reading the lock early to commit time (as in previous implementation of lock elision) is significantly shortened by reading the lock late (as in deferred locking 600). Therefore, the probability of conflict on the lock is lower. A cost analysis equation for a deferred lock read can be expressed as:

Probability(lock_read_early/late_by_THREAD1 collides_with lock_held_by_THREAD2)*(overhead_failing_transaction_transaction+ wasted_work_done_inside_TLE_transaction).

However, it is possible, in an extreme situation where THREAD 2 holds a lock for a very long time, THREAD 1 only discovers the lock being held just before commit, when reading the lock late as described in deferred locking 600. Therefore, an amount of wasted work for THREAD 1 is the entire TLE transaction. However, for a typical transaction memory facility that is interrupt driven and when there exists a real conflict between THREAD 1 and THREAD 2, THREAD 1 would be aborted before reaching the commit point regardless. So the amount of wasted_work_done_inside_TLE_transaction would typically not be the entire transaction.

Another trade-off is reading the lock early can hide the latency of the read itself. However, reading the lock late when using an embodiment of deferred locking 600 requires the read to complete before the transaction can commit. A cost analysis framework as described can be used to determine whether to read the lock early or late. Furthermore, results of such decision can be stored into a database and used to guide and adapt subsequent runs of the same or similar transactions.

FIG. 7 provides a pseudo code example of a conventional locking solution. Conventional locking 700 is a pseudo code example of a conventional locking solution in which an example of lock acquiring 702 and an example of lock releasing 704 are given.

Lock acquiring 702 segment illustrates at the start of a speculation portion determining if a lock is free in statement 706. Lock releasing 704 segment presents the complimentary (to lock acquiring 702) execution of a conventional release code as indicated in statement 708 to release the lock previously acquired in the block of code indicated by lock acquiring 702.

FIG. 8 is a pseudo code example of using an embodiment of the deferred locking system of FIG. 3. Deferred locking 800 is a pseudo code example of a deferred locking solution in which an example of lock acquiring 802 and an example of lock releasing 804 are given.

The segment of lock acquiring 802 illustrates determining whether, a start of a speculation portion is in effect in statement 806. If no speculation the operation may decide to give up and fallback to use conventional lock acquisition or retry the TLE transaction again. This operation sequence is in contrast with the previous operation sequence of conventional locking 700 of FIG. 7. At this same point in FIG. 7 a lock read was performed in the form of determining if lock is free in statement 706 of FIG. 7.

The segment of lock releasing 804 presents a determination of whether the process is within a speculation portion and whether the lock is busy in statement 808. When the lock is busy speculation is aborted. However when the process is ready to commit and inside the speculation portion there is no need to release a lock because execution of the critical section has occurred.

Otherwise the processing did not occur within the TLE transaction and a conventional lock release is executed as indicated in comment statement 810. The conventional release code as indicated in comment statement 810 is used to release the lock previously acquired in the block of code indicated by a fallback portion of lock acquiring 802.

Figure 9:
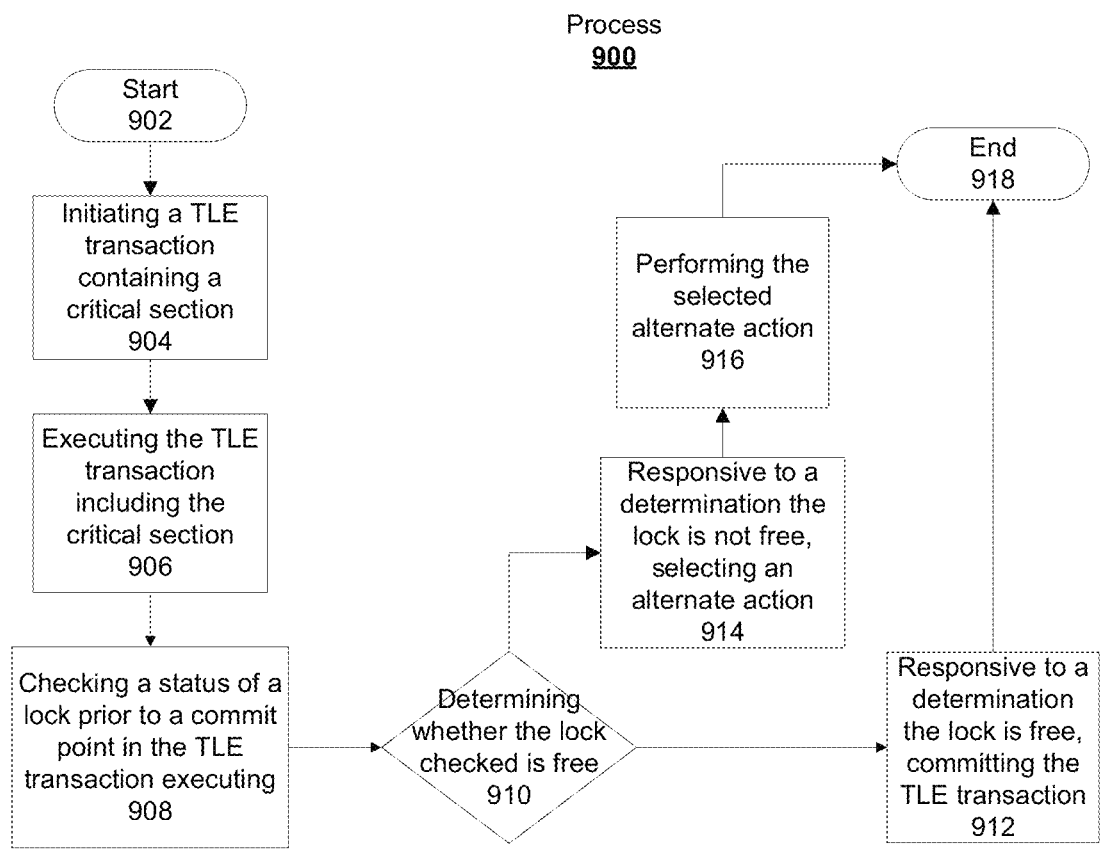
FIG. 9 is a flowchart of a process using the deferred locking system of FIG. 3 in accordance with an embodiment of the disclosure.

FIG. 9 is a flowchart of a process using the deferred locking system of FIG. 3 in accordance with an embodiment of the disclosure. Process 900 is an example using deferred locking system 300 of FIG. 3.

Process 900 begins (step 902) and initiates a TLE transaction containing a critical section (step 904). The TLE transaction typically contains a first section, a critical section and a commit point. Process 900 continues by executing the TLE transaction including the critical section (step 906). Upon completion of the critical section, process 900 checks a status of a lock prior to a commit point in the TLE transaction currently executing (step 908).

Process 900 determines whether the locked checked is free (step 910). Responsive to a determination the lock checked is free; process 900 commits the TLE transaction (step 912) and terminates thereafter (step 918). However, responsive to a determination the lock checked is not free; process 900 selects an alternative action (step 914). Process 900 then performs the selected alternate action (step 916) and terminates thereafter (step 918) as before.

One alternative action may be in the form of a short spin loop placed into the pthread_mutex_exit call when the mutex is locked in statement 808 of FIG. 8 (assuming the transaction has not yet been aborted), rather than aborting immediately when another thread is holding the lock. The short spin loop may be specified as a predetermined duration using either processor cycles or time units. For example a processor cycle count of 5 cycles or a time unit of 3 milliseconds as a predetermined interval. In another alternative, another synchronization mechanism similar to a wait-notify (but not an actual wait-notify) may be used to handle this case. A timeout (for example, specified as a number of time units) may also be required, but using the technique would help to identify an exact earliest moment when a thread holding a lock has completed all the store operations needed to safely determine whether the speculative thread can commit.

Embodiments of the deferred locking process disclosed typically allow more concurrency in cases where speculative and non-speculative critical regions must co-exist, thereby improving a probability a speculative transaction will successfully commit respective results in cases where there is no actual interference from a conventionally locked region.

A transactional lock elision technique is disclosed comprising reading and checking a lock after execution of a critical section within a transaction to allow transactional lock elision transactions to succeed concurrently with critical sections that acquire the associated lock (thereby improving the probability that a speculative transaction will be able to successfully commit its results in cases where there is no actual interference from the traditionally locked region).

Thus is presented in an illustrative embodiment a method for transactional lock elision. The method comprises initiating a transactional lock elision transaction containing a critical section; executing the transactional lock elision transaction including the critical section; checking a status of a lock prior to a commit point in the transactional lock elision transaction executing, wherein the checking the status occurs after processing the critical section; determining whether the status of the lock checked is free; and responsive to a determination the lock checked is free, committing a result of the transactional lock elision transaction.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method, comprising:
   executing a transactional lock elision transaction including a critical section;
   processing the critical section;
   checking, only after concluding the processing of the critical section and prior to a commit point in the transactional lock elision transaction, a status of a lock;
   committing, responsive to a determination that a status of the lock is free, a result of the transactional lock elision transaction.

2. The method of claim 1, further comprising:
   selecting between a lock read early or a lock read late based upon a cost associated with the lock being checked.

3. The method of claim 2, further comprising:
   storing results of the selecting into a database; and
   using the stored results stored to guide subsequent runs of a similar transaction.

4. The method of claim 1, wherein
   a time window from reading the lock early to a commit time is greater than a time window from reading the lock late to the commit time,
   a probability of conflict on the lock in deferred locking is less than a probability of conflict on the lock in conventional locking.

5. A computer hardware system, comprising
   a hardware processor configured to initiate the following operations:
   executing a transactional lock elision transaction including a critical section;
   processing the critical section;
   checking, only after concluding the processing of the critical section and prior to a commit point in the transactional lock elision transaction, a status of a lock;
   committing, responsive to a determination that a status of the lock is free, a result of the transactional lock elision transaction.

6. The system of claim 5, wherein the hardware processor is further configured to initiate the operation of:
   selecting between a lock read early or a lock read late based upon a cost associated with the lock being checked.

7. The system of claim 6, wherein the hardware processor is further configured to initiate the operations of:
   storing results of the selecting into a database; and
   using the stored results stored to guide subsequent runs of a similar transaction.

8. The system of claim 5, wherein
   a time window from reading the lock early to a commit time is greater than a time window from reading the lock late to the commit time,
   a probability of conflict on the lock in deferred locking is less than a probability of conflict on the lock in conventional locking.

9. The system of claim 5, wherein the hardware processor is further configured to initiate the operation of:
   selecting, responsive to a determination that the status of the lock is not free, an action from a set of alternative actions.

10. The system of claim 9, wherein
    the set of alternate actions includes
    performing a short spin loop and
    performing a wait-notify.

11. The system of claim 9, wherein the hardware processor is further configured to initiate the operation of:
    performing at least one alternate action selected from the set of alternate actions.

12. A computer program product, comprising:
    a hardware storage device having stored therein program code,
    the program code, when executed by a computer hardware system, causes the computer hardware system to perform:
    executing a transactional lock elision transaction including a critical section;
    processing the critical section;
    checking, only after concluding the processing of the critical section and prior to a commit point in the transactional lock elision transaction, a status of a lock;
    committing, responsive to a determination that a status of the lock is free, a result of the transactional lock elision transaction.

13. The computer program product of claim 12, wherein the program code further causes the computer hardware system to perform:
    selecting between a lock read early or a lock read late based upon a cost associated with the lock being checked.

14. The computer program product of claim 13, wherein the program code further causes the computer hardware system to perform:
    storing results of the selecting into a database; and
    using the stored results stored to guide subsequent runs of a similar transaction.

15. The computer program product of claim 12, wherein
a time window from reading the lock early to a commit time is greater than a time window from reading the lock late to the commit time,
a probability of conflict on the lock in deferred locking is less than a probability of conflict on the lock in conventional locking.

16. The computer program product of claim 12, wherein the program code further causes the computer hardware system to perform:
selecting, responsive to a determination that the status of the lock is not free, an action from a set of alternative actions.

17. The computer program product of claim 16, wherein the set of alternate actions includes
performing a short spin loop and
performing a wait-notify.

18. The computer program product of claim 16, wherein the program code further causes the computer hardware system to perform:
performing at least one alternate action selected from the set of alternate actions.

\* \* \* \* \*